US010877625B2

(12) United States Patent
Hosoda

(10) Patent No.: US 10,877,625 B2
(45) Date of Patent: Dec. 29, 2020

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Yuichi Hosoda, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 550 days.

(21) Appl. No.: 15/195,211

(22) Filed: Jun. 28, 2016

(65) Prior Publication Data

US 2017/0010767 A1 Jan. 12, 2017

(30) Foreign Application Priority Data

Jul. 10, 2015 (JP) .................................. 2015-139107

(51) Int. Cl.
*G06F 3/0482* (2013.01)
*H04N 1/00* (2006.01)
*G06F 3/12* (2006.01)

(52) U.S. Cl.
CPC ............ *G06F 3/0482* (2013.01); *G06F 3/121* (2013.01); *G06F 3/1253* (2013.01);
(Continued)

(58) Field of Classification Search
CPC ......... G06F 3/0482; G06F 2203/04803; G06F 3/1203; G06F 3/121; G06F 3/1253; H04N 1/0035
See application file for complete search history.

(56) References Cited

U.S. PATENT DOCUMENTS 4,195,353 A * 3/1980 Abe ........................... B41J 3/46
                                                     715/210
5,706,411 A * 1/1998 McCormick ........... G06K 15/00
                                                     358/1.14
(Continued)

FOREIGN PATENT DOCUMENTS

CN       104246684 A       12/2014
CN       104320557 A        1/2015
(Continued)

OTHER PUBLICATIONS

Chinese Office Action issued in corresponding Chinese Application No. 201610523455.0 dated Jun. 14, 2019.
(Continued)

*Primary Examiner* — James T Tsai
(74) *Attorney, Agent, or Firm* — Venable LLP

(57) ABSTRACT

An information processing apparatus divides a screen of a display unit into a first display area for displaying a list of application items for a user to select an executable application and a second display area for displaying information regarding a state of the screen or a state of the information processing apparatus, and decides a display position of the first display area when the occurrence of an anomaly is detected. The apparatus displays the list of application items in the decided first display area whose display position is decided, and displays information regarding the anomaly in the second display area. The decided display position of the first display area is a position in which the size of the first display area is smaller than in the case in which an anomaly is not detected.

10 Claims, 11 Drawing Sheets

(52) U.S. Cl.
CPC ......... *H04N 1/0035* (2013.01); *G06F 3/1203* (2013.01); *G06F 2203/04803* (2013.01)

(56) References Cited

U.S. PATENT DOCUMENTS

| | | | | |
|---|---|---|---|---|
| 5,715,415 | A * | 2/1998 | Dazey | G06F 3/04895 |
| | | | | 715/708 |
| 6,222,539 | B1 * | 4/2001 | Watts | H04N 1/00352 |
| | | | | 715/708 |
| 10,394,496 | B2 * | 8/2019 | Shimanuki | G06F 3/1285 |
| 2002/0171681 | A1 * | 11/2002 | Nomura | H04N 1/00411 |
| | | | | 715/772 |
| 2005/0114790 | A1 * | 5/2005 | Dunbar | G06F 3/0481 |
| | | | | 715/785 |
| 2008/0010519 | A1 * | 1/2008 | Beyer | G06F 11/326 |
| | | | | 714/21 |
| 2010/0281360 | A1 * | 11/2010 | Arakane | H04N 1/00411 |
| | | | | 715/244 |
| 2014/0026092 | A1 * | 1/2014 | Oguma | G06F 3/0481 |
| | | | | 715/777 |
| 2015/0222767 | A1 * | 8/2015 | Fukuoh | H04N 1/00411 |
| | | | | 358/1.15 |
| 2016/0105582 | A1 * | 4/2016 | Nakajima | G06F 3/1238 |
| | | | | 358/1.15 |
| 2016/0266849 | A1 * | 9/2016 | Honda | G06F 3/1224 |
| 2017/0336627 | A1 * | 11/2017 | Ieda | B60K 35/00 |

FOREIGN PATENT DOCUMENTS

| | | |
|---|---|---|
| CN | 10465711 A | 5/2015 |
| CN | 104657100 A | 5/2015 |
| CN | 104699396 A | 6/2015 |
| JP | 2003-140798 A | 5/2003 |

OTHER PUBLICATIONS

Chinese Office Action dated Apr. 17, 2020 in counterpart Chinese Patent Appln. No. 201610523455.0.

* cited by examiner

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium.

Description of the Related Art

Multi-function peripherals and printers in recent years are, similarly to PCs (personal computers), often equipped with a display device that has high expressiveness and that can display graphics such as windows, icons and buttons on a screen. Such a display device that has high expressiveness will, for example, be about seven to ten inches in size just with the display unit alone, and is therefore not suitable for compact multi-function peripherals or printers in terms of the balance with the size of the main body. If the size of the main body of the apparatus is determined in accordance with the size of such a display device, the size of the main body increases, and the advantages as a compact apparatus are lost. Moreover, even with display devices that have high expressiveness, there are more compact display devices, but if such compact display devices are adopted, the cost is high, and it becomes impossible to compete in price competition in the printer market. For this reason, with compact multi-function peripherals and printers, there is a tendency for compact display devices with lower cost to be adopted, even if the expressiveness is poor.

With such multi-function peripherals and printers, it is demanded, in the case where an anomaly occurs, for example, to display the content of the anomaly as a message on the display device. This is because there is a possibility that the anomaly that has occurred (for example, a state in which a consumable component has reached the end of its life and printing cannot be performed) will inhibit a user from executing an application, and thus it is necessary to notify the user that the anomaly has occurred.

In such a case, in the above-described display device having high expressiveness, information regarding an application and device state information can be displayed at the same time, as described in Japanese Patent Laid-Open No. 2003-140798, for example. Specifically, the screen is divided into an application display area and a message display area, and the necessary information is displayed in each of the areas, whereby it is possible to notify the application that is being executed and a message to the user at the same time. Accordingly, the user can confirm the content of the anomaly displayed in the message display area while performing an operation of instructing the execution of a desired application in the application display area. Accordingly, if it is determined that the anomaly influences the execution of the application that is being operated, it is possible to take measures for canceling the anomaly. In contrast, a compact display device having poor display capability has a small screen and a limited display area, and thus the above technique cannot be adopted.

For example, as shown in FIG. 11A, with a display device having a screen that can display only four lines of text, on a home screen, three lines are used as an application display area 1101 for displaying a list of application item names for selection.

In this state, if, for example, an out-of-paper occurs in the printer, one line is used as a message display area 1102 in order to inform the anomaly to the user, in order to notify the anomaly content as shown in FIG. 11B, for example. With the message, the user is then informed that a cassette 1 has run out of paper. At this time, the remaining two lines are assigned to the application display area 1101.

However, for example, with a one-line message such as is shown in FIG. 11B, even if it is possible to inform an out-of-paper, it is not possible to inform a counter measure for resolving the out-of-paper state. That is, in the example in FIG. 11B, the user knows that an out-of-paper state has occurred in the cassette 1, but cannot determine what size and type of paper the cassette 1 needs to be replenished with.

In view of this, for example, as shown in FIG. 11C, it is also conceivable to use one more line as the message display area 1102, and to display the paper size and paper type (here, A4 and plain paper) in addition to the above-described anomaly notification. However, in this case, only one line can be assigned as the application display area 1101 for displaying the application item names for selection, and it becomes difficult for the user to perform an operation of searching for and selecting an application to execute.

SUMMARY OF THE INVENTION

An aspect of the present invention is to eliminate the above-mentioned problems with conventional technology.

A feature of the present invention is to provide, even with a display unit having a display screen with poor display capability, a technique that makes it possible to present information regarding an anomaly that has occurred to a user, without deteriorating the operability of the user to instruct an application.

According to a first aspect of the present invention, there is provided an information processing apparatus for controlling display on a display unit, comprising: a detection unit configured to detect an anomaly; a decision unit configured to divide a screen of the display unit into a first display area for displaying a list of application items for a user to select an executable application and a second display area for displaying information regarding a state of the screen or a state of the information processing apparatus, and to decide a display position of the first display area when the anomaly is detected by the detection unit; and a control unit configured to control to display the list of application items in the first display area whose display position is decided by the decision unit when the anomaly is detected by the detection unit, and display information regarding the anomaly in the second display area, wherein the display position of the first display area that is decided by the decision unit is a display position in which the first display area is smaller than in a case where the anomaly is not detected by the detection unit.

According to a second aspect of the present invention, there is provided a method of controlling an information processing apparatus for controlling display on a display unit, comprising: detecting an anomaly; dividing a screen of the display unit into a first display area for displaying a list of application items for a user to select an executable application and a second display area for displaying information regarding a state of the screen or a state of the information processing apparatus; deciding a display position of the first display area when the anomaly is detected in the detecting; and displaying the list of application items in the first display area whose display position is decided in the deciding when the anomaly is detected in the detecting, and displaying information regarding the anomaly in the second display area, wherein the display position of the first display area that is decided in the deciding is a display position in which the first display area is smaller than in a case where an anomaly is not detected in the detecting.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that in the embodiments, the information processing apparatus of the present invention will be described using an image forming apparatus as an example, but the present invention is not limited to such an image forming apparatus, and, for example, a mobile terminal, a compact printer and communication apparatus or the like may be adopted.

First Embodiment

Figure 1:
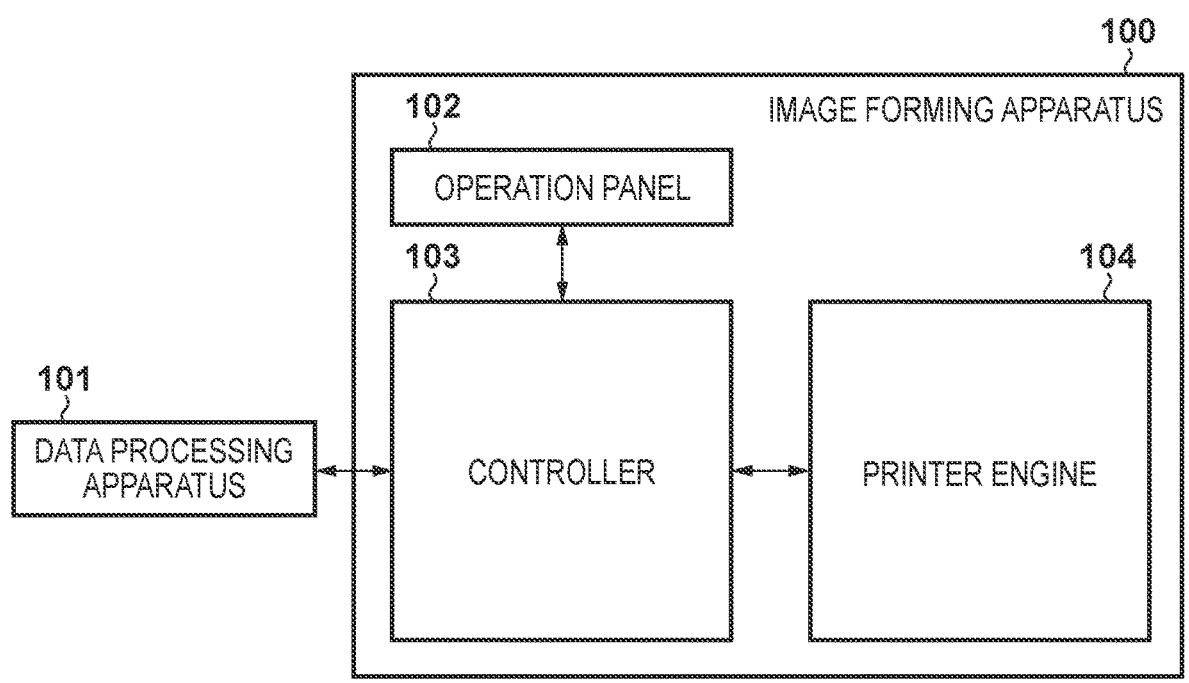
FIG. 1 is a block diagram showing a schematic configuration of an image forming apparatus according to a first embodiment of the present invention.

FIG. 1 is a block diagram showing the schematic configuration of an image forming apparatus 100 according to a first embodiment of the present invention.

The image forming apparatus 100 is connected to a data processing apparatus 101 via a network such as a LAN or an interface cable. The image forming apparatus 100 is, for example, an image forming apparatus (printing apparatus) having a printer engine 104 of an electrophotographic type or the like, or may be a multi-function peripheral (MFP) further having a scanner function and a FAX function. For example, the data processing apparatus 101 is a computer device such as a PC, and functions as a data supply source of printing information and the like to the image forming apparatus 100. A controller 103 functions as a control unit that controls the operations of the image forming apparatus 100, and controls display processing on an operation panel 102, processing in accordance with instructions from the user input via the operation panel 102, copy processing using a scanner, and the like. The controller 103 also controls the operations of a printer that generates raster data for each page based on information such as page description language (hereinafter, PDL) supplied from the data processing apparatus 101 and sends the raster data to the printer engine 104 to be printed, for example. The printer engine 104 forms (prints) an image by forming a latent image on a photosensitive drum based on the raster data supplied from the controller 103, transferring the latent image onto a recording medium (sheet) and fixing the latent image, for example. The operation panel 102 functions as a user interface and has a display unit having a touch panel function and a key operation unit including hard keys, and instructions from the user input via the operation panel 102 are sent to the controller 103. Accordingly, the controller 103 can execute various applications in accordance with operations performed by the user via the operation panel 102.

Figure 2:
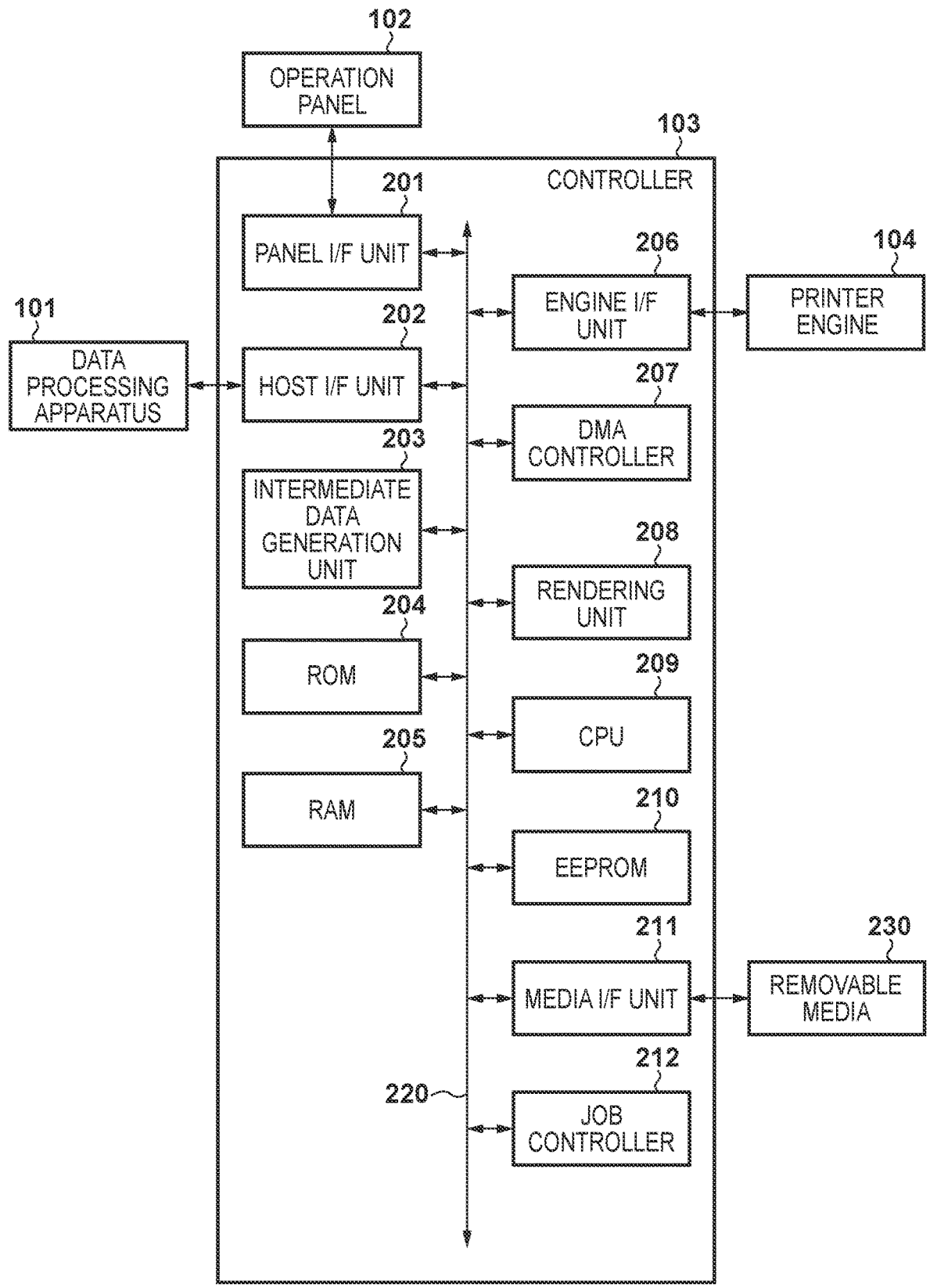
FIG. 2 is a block diagram for describing a configuration of a controller of the image forming apparatus according to the first embodiment.

FIG. 2 is a block diagram for describing the configuration of the controller 103 of the image forming apparatus 100 according to the first embodiment.

A panel I/F (interface) unit 201 controls an interface to the operation panel 102. A CPU 209 receives, via the panel I/F unit 201, various settings and instruction contents input by the user via the operation panel 102. A host I/F unit 202 bidirectionally communicates with the data processing apparatus 101 such as a host computer via a network. An intermediate data generation unit 203 converts the print data of a print job received from the data processing apparatus 101 via the host I/F unit 202 into intermediate data that is easily handled by the image forming apparatus 100. A ROM 204 holds program code that is executed by the CPU 209. A RAM 205 functions as a main memory of the CPU 209, and is used for temporarily saving programs and various types of data. The RAM 205 is also used as a storage region for the print data received via the host I/F unit 202, the intermediate data generated by interpreting the print data, and bitmap data generated by rendering the intermediate data. Furthermore, the RAM 205 is also used for storing various processing statuses, log information and the like necessary for other processing. An engine I/F unit 206 controls an interface between the controller 103 and the printer engine 104. The CPU 209 recognizes the state of the printer engine 104 via the engine I/F unit 206. A DMA controller 207 is used for DMA-transferring the bitmap data stored in the RAM 205 to the engine I/F unit 206. A rendering unit 208 renders the intermediate data stored in the RAM 205 into bitmap data. The CPU 209 controls devices connected to a bus 220 based on control program code stored in the ROM 204. An EEPROM 210 is a nonvolatile memory for holding the setting information of the image forming apparatus 100 and the like. A media I/F unit 211 reads/writes various types of data such as image data, program data, device setting data from/to removable media 230 such as a USB memory. A job controller 212 is a module of a program held in the ROM 204, and at the time of execution, the program is deployed in the RAM 205 of the controller 103, and is executed under the control by the CPU 209. Data received from the data processing apparatus 101 via the job controller 212 is saved as a print job in the RAM 205 by the CPU 209, which then executes print processing. The CPU bus 220 includes an address bus, a data bus, and a control bus, and the CPU 209 can access and control all the devices connected to the CPU bus 220. Note that the intermediate data generation unit 203, the rendering unit 208 and the job controller 212 may be constituted by hardware, or the functions thereof may be achieved by the CPU 209 executing the above-described programs.

Figure 3:
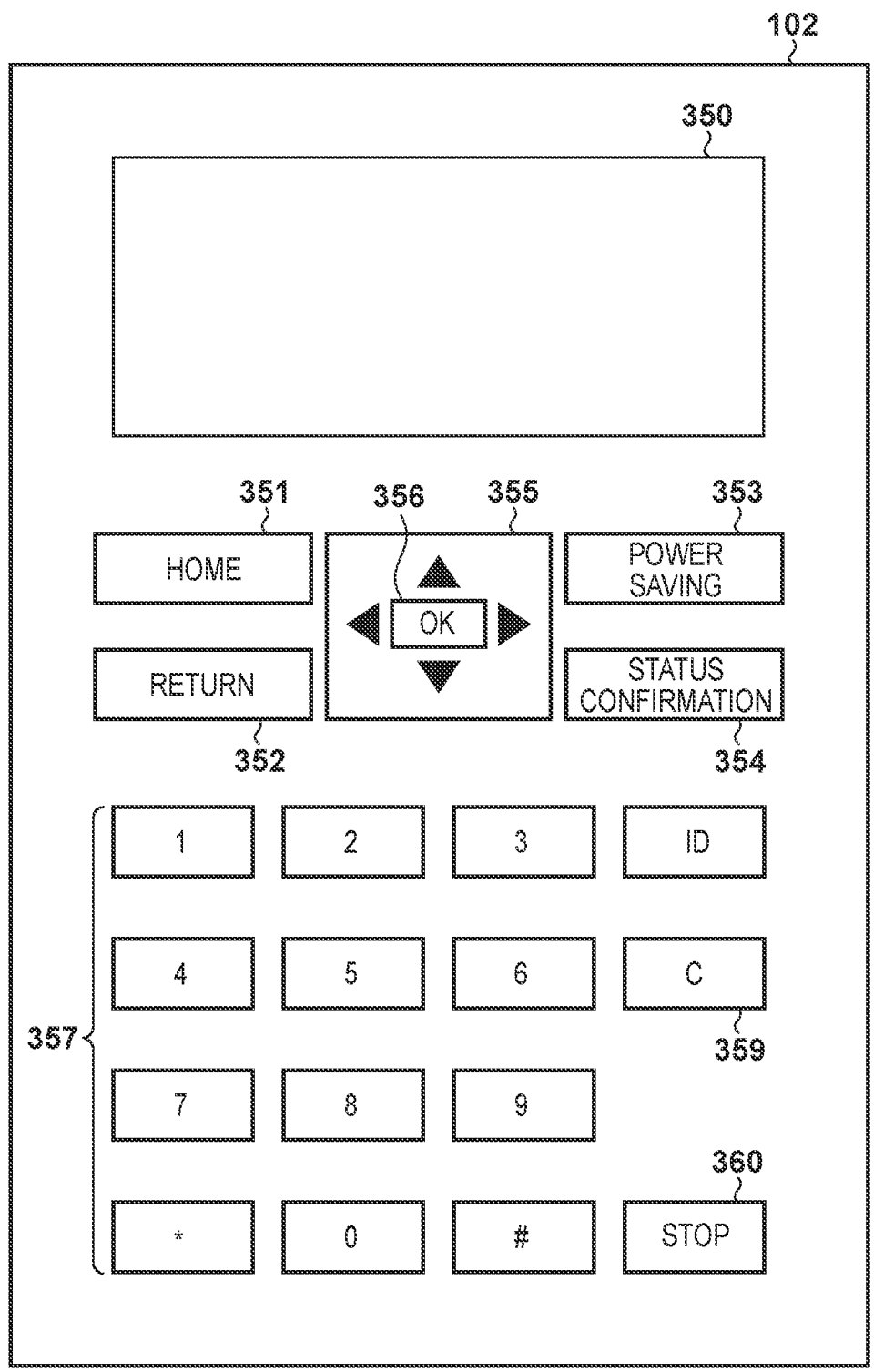
FIG. 3 depicts a top view of an operation panel of the image forming apparatus according to the first embodiment.

FIG. 3 depicts a top view of the operation panel 102 of the image forming apparatus 100 according to the first embodiment.

The CPU 209 outputs data that is displayed on a display unit 350 to the operation panel 102 via the panel I/F unit 201. A home key 351 is a key for instructing to display the home screen, and when this home key 351 is pressed, the display is always switched to the home screen whatever screen is being displayed. A return key 352 is a key for instructing to return to the screen that was displayed immediately before the current screen. A power saving key 353 instructs to shift to a power saving state in which the power consumed by the image forming apparatus 100 is suppressed. A status confirmation key 354 is a key operated when the user confirms the status of the image forming apparatus 100, and by pressing this status confirmation key 354, the user can confirm an abnormal status of the image forming apparatus 100, a status of the print job that is being processed by the image forming apparatus 100, and the like. Cursor keys 355 are keys for moving a cursor that is displayed on the display unit 350, and can move the cursor in the directions of left, right, up and down arrows. An OK key 356 is a key for selecting an item instructed using the cursor on the display unit 350, and instructing the execution of the item. A numeric keypad 357 enables numerals and signs displayed on the keys to be input. A clear key 359 is used for clearing information input using the numeric keypad 357. A stop key 360 is a key for instructing the image forming apparatus 100 to stop the job that is being executed.

Figure 4A:
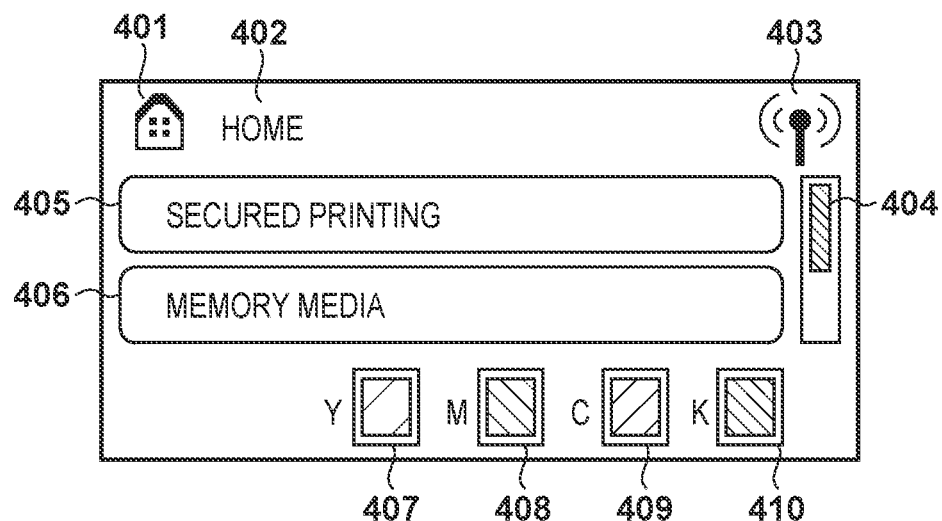
FIGS. 4A and 4B depict views illustrating examples of a home screen that is displayed on a display unit of the operation panel of the image forming apparatus.
Figure 4B:
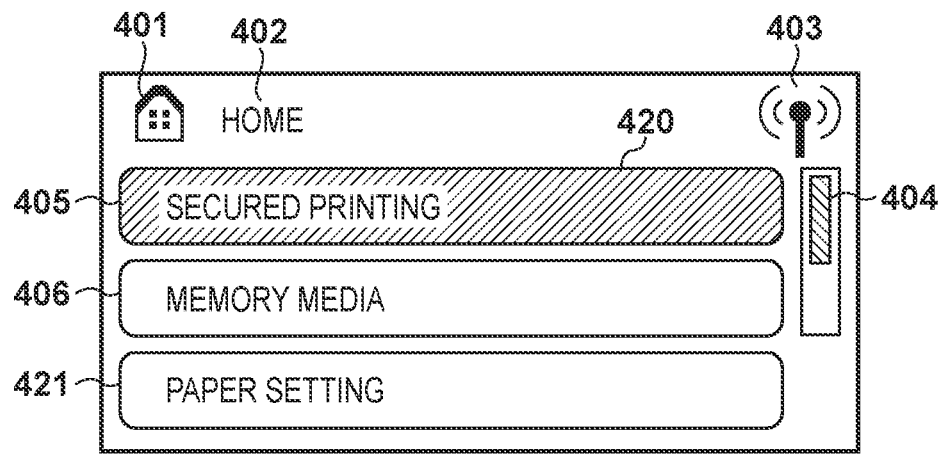

FIGS. 4A and 4B depict views showing examples of the home screen displayed on the display unit 350 of the operation panel 102 of the image forming apparatus 100.

FIG. 4A shows a view illustrating an example of a home screen after the controller 103 is started by operating a power supply button (not illustrated). FIG. 4B depicts a view illustrating an example of a home screen displayed when the user operates one of the cursor keys 355 shown in FIG. 3 when the screen in FIG. 4A is displayed. Here, assume that the display unit 350 can display four lines of messages and the like.

An icon 401 is an icon indicating that this screen is the home screen. A text 402 is text display indicating that this screen is the home screen. An icon 403 is an icon indicating a communication connection status of a wireless LAN (Local Area Network). Items 405 and 406 indicate application items that can be executed in this image forming apparatus 100. Here, the item 405 indicates an application for secured printing, and the item 406 indicates an application for media printing for printing data stored in memory media. A scroll bar 404 is a key for scrolling the list of application items. Reference numerals 407 to 410 are used for displaying the remaining toner amounts of Y, M, C and K toner cartridges of the printer engine 104.

When the cursor key 355 is operated in a state shown in FIG. 4A, a cursor 420 moves to the application item 405 and "secured printing" is selected as shown in FIG. 4B. Furthermore, at this time, instead of the display of the remaining amounts 407 to 410 of the toner cartridges displayed FIG. 4A, an application item 421 "paper setting" is displayed. Accordingly, the user can easily jump to a screen for setting the size and type of paper to be printed for "secured printing". Note that the scroll bar 404 has different display modes in accordance with the number of application items that are displayed, the position of the cursor 420, and the like.

Figure 5:
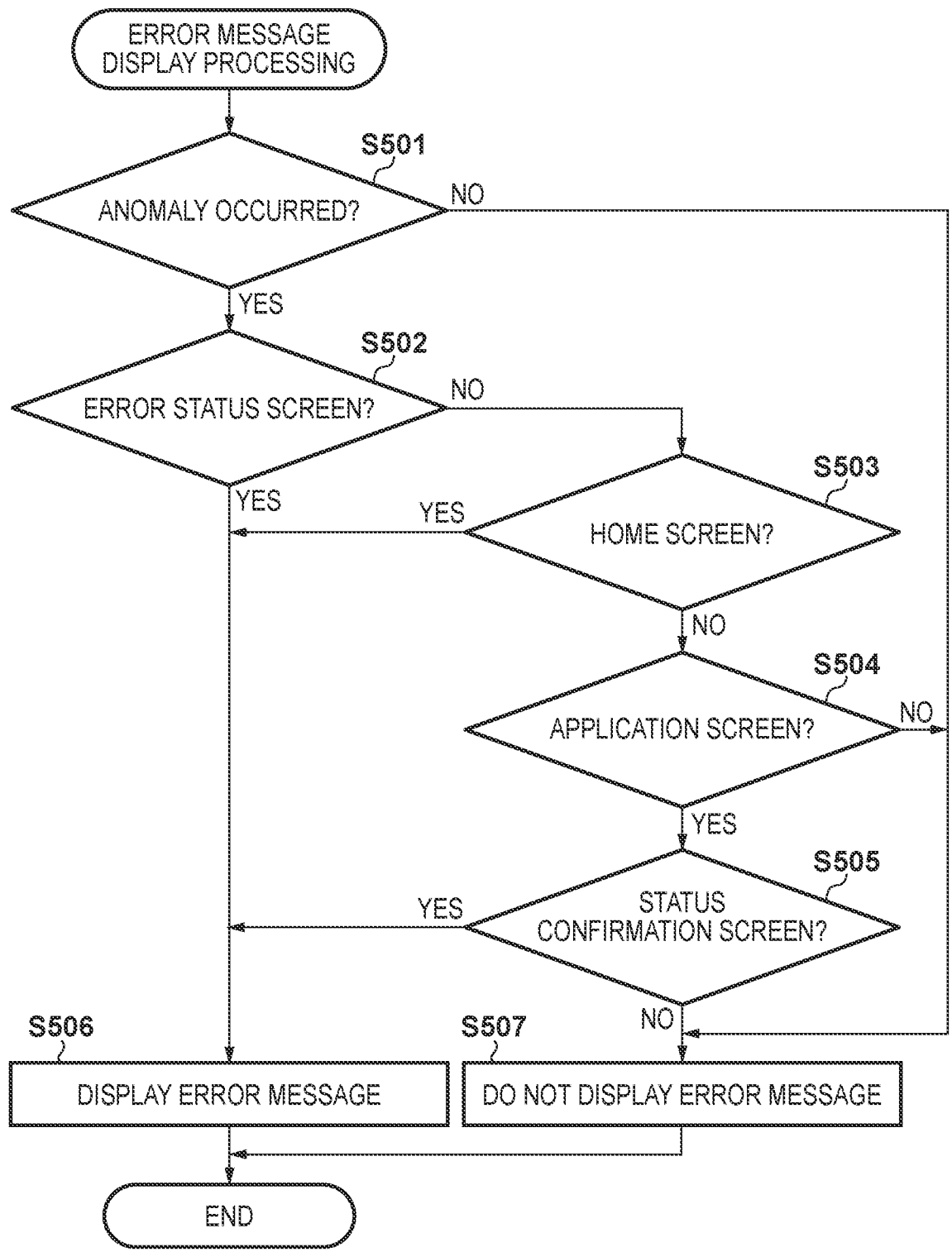
FIG. 5 is a flowchart for describing error message display processing performed by the controller of the image forming apparatus according to the first embodiment.

FIG. 5 is a flowchart for describing error message display processing performed by the controller 103 of the image forming apparatus 100 according to the first embodiment. Note that a program for executing this processing is stored in the ROM 204, and at the time of execution, is deployed in the RAM 205 and executed under the control by the CPU 209.

First, in step S501, the CPU 209 determines whether or not an anomaly has occurred in the image forming apparatus 100. If it is determined in step S501 that an anomaly has occurred, the CPU 209 advances the procedure to step S502, but otherwise the procedure is advanced to step S507. In step S502, the CPU 209 determines whether or not the screen that is currently displayed on the display unit 350 is an error status screen displayed by operating the status confirmation key 354. If it is determined here that the current screen is the error status screen, the procedure is advanced to step S506, but otherwise the procedure is advanced to step S503. In step S506, the CPU 209 displays a predetermined error message that is based on the content of the anomaly that has occurred in the image forming apparatus 100, and ends this processing.

Figure 8A:
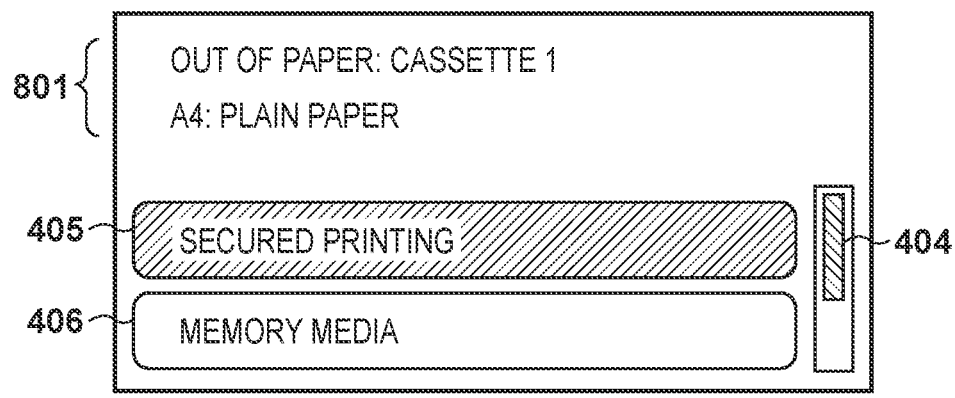
FIGS. 8A and 8B depict views showing examples of a home screen displayed on the display unit of the operation panel when an anomaly occurs in the image forming apparatus according to the first embodiment.
Figure 11A:
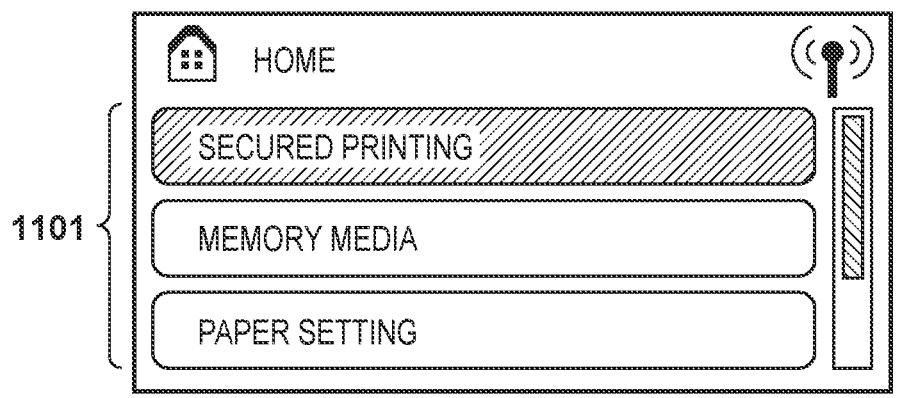
FIGS. 11A to 11C depict views for describing a problem to be solved by the present invention.
Figure 11B:
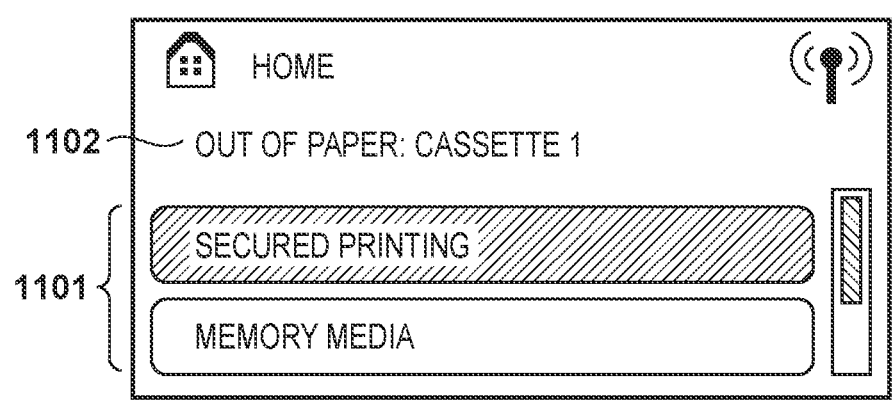
Figure 11C:
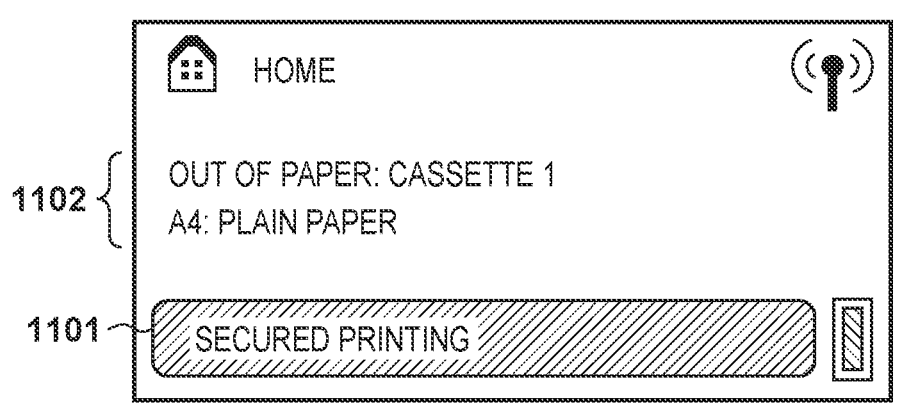

However, if it is determined in step S502 that the current screen is not the error status screen, the CPU 209 advances the procedure to step S503, where it is determined whether or not the screen that is currently displayed on the display unit 350 is the home screen as shown in FIG. 4A, for example. If it is determined in step S503 that the current screen is the home screen, the CPU 209 advances the procedure to step S506, where an error message is displayed as will be described later with reference to FIG. 8A, for example, and ends this processing. In FIG. 8A, for example, instead of the icon 401 and the text 402 that were displayed in the first line on the screen in FIG. 4A and indicate that the current screen is the home screen, the type of the error as well as the paper size and paper type for handling the error are displayed. Therefore, two application items 405 and 406 can be displayed in the application item display area 1101. Accordingly, compared to FIG. 11C above, the display area 1101 for displaying application item names for selection can be extended.

Figure 8B:
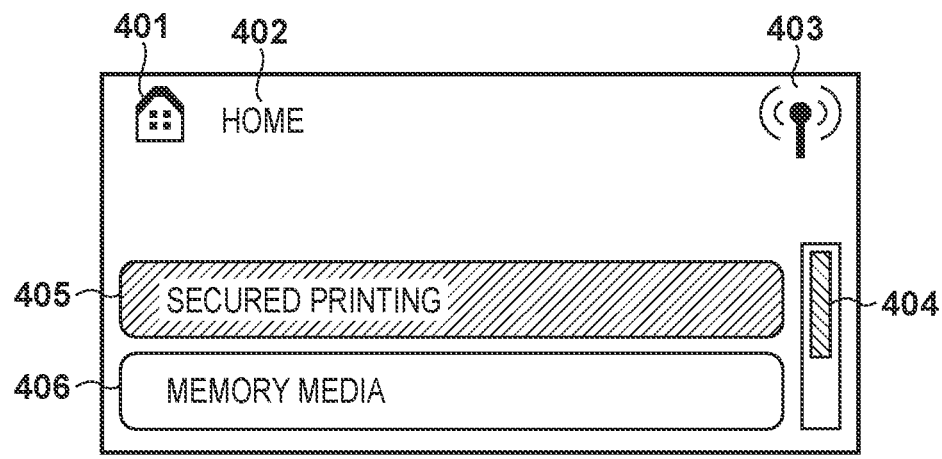

Note that a display area for the icons 401 and 403 and the text 402 in FIG. 8B is a display area for displaying information related to the state of this image forming apparatus 100, the state of a screen (home screen) and the like.

If the CPU 209 determines in step S503 that the current screen is not the home screen, the procedure is advanced to step S504, where it is determined whether or not the screen that is currently displayed on the display unit 350 is an application screen that will be described later with reference to FIGS. 9A to 9D. If it is determined here that the current screen is not an application screen, the procedure is advanced to step S507 and the CPU 209 ends this processing without displaying an error message. If it is determined in step S504 that the application screen is being displayed, the procedure is advanced to step S505, and the CPU 209 determines whether or not the screen that is currently displayed on the display unit 350 is in particular a status confirmation screen as shown in FIG. 9C out of application screens that will be described later with reference to FIGS. 9A to 9D. If so, the CPU 209 advances the procedure to step S506, where the CPU 209 displays an error message using a screen that will be described later with reference to FIG. 9D, and ends this processing. Otherwise, the CPU 209 advances the procedure to step S507 and the CPU 209 ends this processing without displaying an error message.

Figure 6:
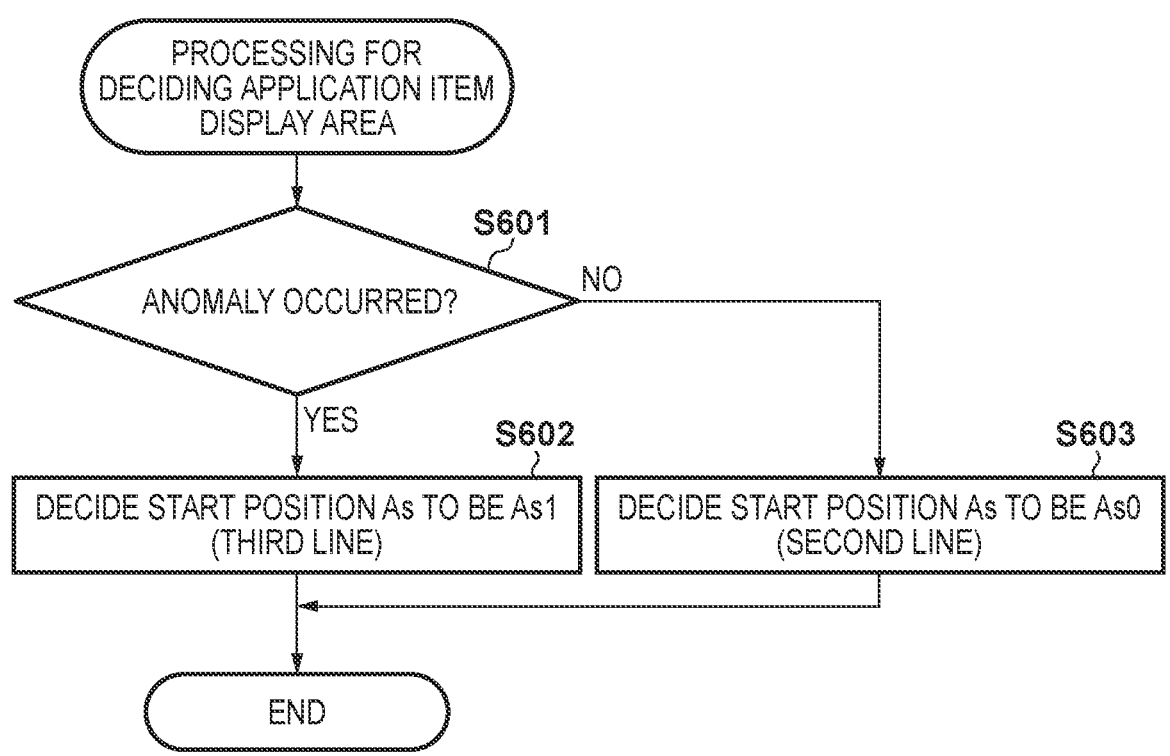
FIG. 6 is a flowchart for describing processing for deciding a start position of an application item display area by the controller of the image forming apparatus according to the first embodiment.

FIG. 6 is a flowchart for describing processing for deciding a start position of the application item display area by the controller 103 of the image forming apparatus 100 according to the first embodiment. Note that a program for executing this processing is stored in the ROM 204, and at the time of execution, is deployed in the RAM 205 and executed under the control by the CPU 209.

The application item display area is an area in which the application items 405, 406 and 421 in the home screen in FIG. 4B as described above are displayed, for example. In the example in FIG. 4B, a configuration is adopted in which only four lines in total can be displayed in the home screen, and thus the application item display area is constituted by three lines, namely the second line to the fourth line. The top line is used as a screen hierarchy display area for displaying the icon 401 and the text 402 indicating that the current screen is the home screen. Therefore, in the example in FIG. 4B, the start position of the application item display area is the second line in which the application item 405 is displayed.

Note that, here, it is assumed that the number of lines in the display area of the display unit 350 is four, a start position As of the application item display area at a normal time is As=2 (=As0) as shown in FIG. 4A, and the start position As at the time of an anomaly is As=3 (=As1) as shown in FIG. 8A, for example. In addition, the case will be described in which an end position Ae of the application item display area is the fourth line that represents the last line.

First, in step S601, the CPU 209 determines whether or not an anomaly has occurred in the image forming apparatus 100. If it is determined in step S601 that an anomaly has occurred, the CPU 209 advances the procedure to step S602, where the start position As of the application item display area is decided to be the start position As1 of the application item display area at the time of the occurrence of an anomaly. This corresponds to the third line in which the application item 405 is displayed on the screen in FIG. 8A that will be described later. On the other hand, if the CPU 209 determines in step S601 that an anomaly has not occurred, the procedure is advanced to step S603, where the start position As of the application item display area is decided to be the start position As0 of the application item display area at a normal time, and this processing is ended. This start position As0 corresponds to the second line in which the application item 405 is displayed in the above-described screen in FIG. 4B, for example.

As described above, according to the flowchart in FIG. 6, the start position As of the application item display area in the home screen can be decided depending on whether or not an anomaly has occurred in the image forming apparatus 100. That is, when an anomaly has occurred in the image forming apparatus 100, the first line and second line in the display unit 350 are respectively used as display areas for the content of the anomaly and a counter measure for the anomaly, and the display start position of application items is set to the next position (third line).

Figure 7:
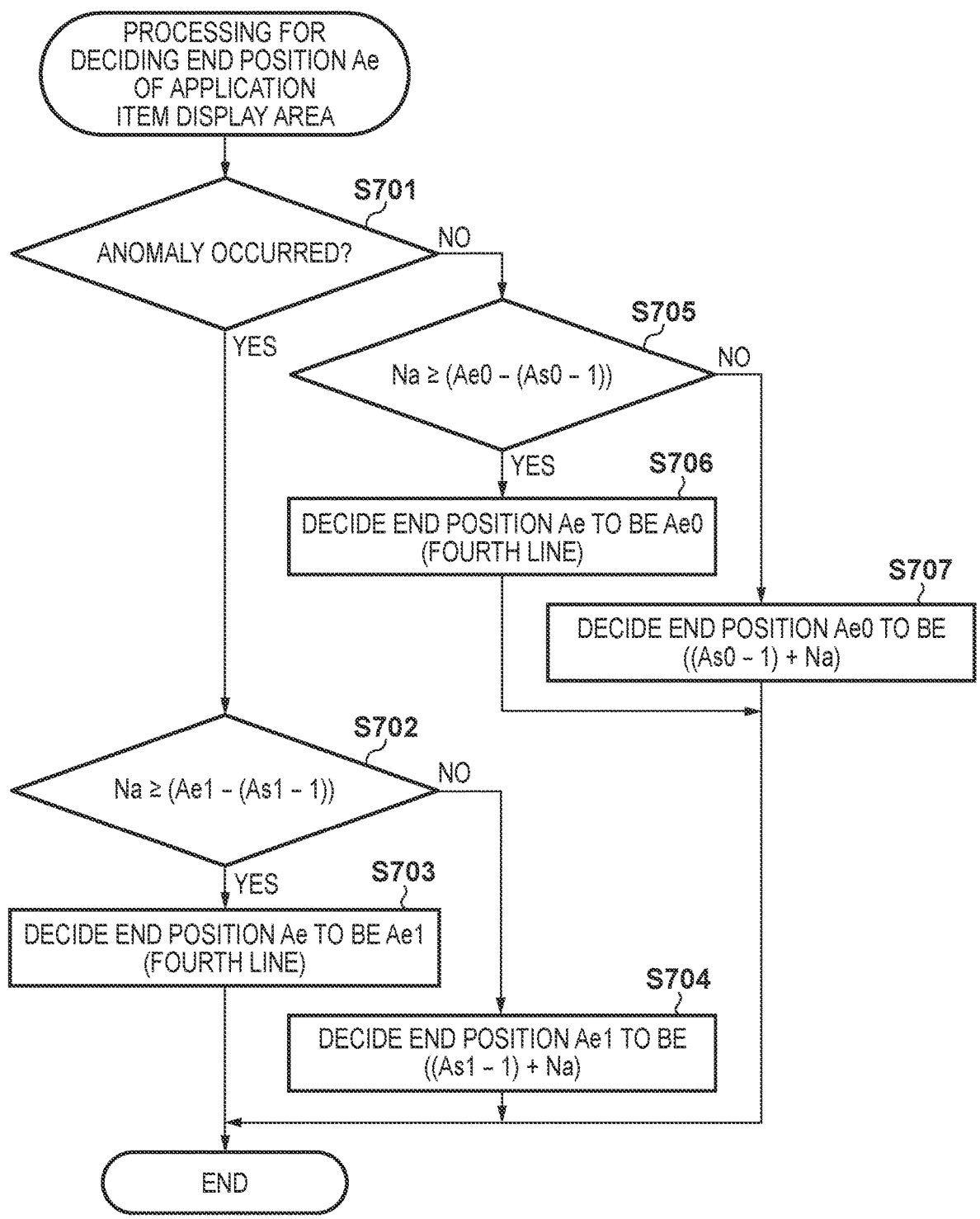
FIG. 7 is a flowchart for describing processing for deciding an end position of the application item display area by the controller of the image forming apparatus according to the first embodiment.

FIG. 7 is a flowchart for describing the processing for deciding the end position of the application item display area by the controller 103 of the image forming apparatus 100 according to the first embodiment. Note that a program for executing this processing is stored in the ROM 204, and at the time of execution, is deployed in the RAM 205 and executed under the control by the CPU 209. For example, in the above-described example of the home screen in FIG. 4B, the end position of the application item display area is the fourth line in which the application item 421 is displayed.

Note that, here also, it is assumed that the number of lines in the display area of the display unit 350 is four, the start position As0 of the application item display area at a normal time is As0=2 as in FIG. 4A, and the start position As1 at the time of an anomaly is As1=3 as in FIG. 8A, for example. Moreover, an end position Ae0 of the application item display area at a normal time is Ae0=4 as in FIG. 4A, and an end position Ae1 at the time of an anomaly is Ae1=4 as in FIG. 8A, for example.

First, in step S701, the CPU 209 determines whether or not an anomaly has occurred in the image forming apparatus 100. If it is determined here that an anomaly has not occurred, the procedure is advanced to step S705, and if it is determined that an anomaly has occurred, the procedure is advanced to step S702. In step S702, the CPU 209 determines whether or not Na≥(Ae1−(As1−1)). Here, As1 is the start position of the application item display area at the time of an anomaly, as described above. Na is the number of target applications that are displayed in the application item display area, Ae0 is the end position of the application item display area at a normal time, and Ae1 is the end position of the application item display area at the time of an anomaly. If it is determined in step S702 that the above condition is satisfied, the CPU 209 advances the procedure to step S703, where the end position Ae of the application item display area (here, 4) is decided to be the end position Ae1 of the application item display area at the time of an anomaly, and ends this processing. The end position at this time corresponds to the position of the application item 406 (here, "memory media") in the fourth line on the screen in FIG. 8A that will be described later. Accordingly, for example, the number Na of application items targeted for display is "two", and at the time of an anomaly, the end position Ae1 of the application item display area is the "fourth" line and the start position As1 of the application item display area is the "third" line.

On the other hand, if it is determined in step S702 that the above condition is not satisfied, the CPU 209 advances the procedure to step S704, where the CPU 209 decides the end position Ae1 of the application item display area to be ((As1−1)+Na), and ends this processing. In this case, the end position Ae1 of the application item display area at the time of an anomaly is decided using the start position As1 of the application item display area at the time of an anomaly and the number Na of application items that are displayed. In this case, for example, in the above-described example, the number Na of applications targeted for display is two or less, and thus an application item is displayed in only lines indicated by As1 (here, the third line), leaving the fourth line blank.

Moreover, in step S705, the CPU 209 determines whether or not Na≥(Ae0−(As0−1)). Again, Na is the number of applications targeted for display in the application item display area, Ae0 is the end position of the application item display area at a normal time, and As0 is the start position of the application item display area at a normal time that is described above. If the CPU 209 determines in step S705 that the above condition is met, the procedure is advanced to step S706, where the end position Ae (here, 4) of the application item display area is decided to be the end position Ae0 of the application item display area at a normal time, and this processing is ended. This corresponds to the position of the application item 421 ("paper setting") in the fourth line in the above-described screen in FIG. 4B. In this manner, as many applications targeted for display as possible can be displayed.

On the other hand, if the CPU 209 determines in step S705 that the above condition is not met, the procedure is advanced to step S707, where the end position Ae0 of the application item display area at a normal time is decided to be ((As0−1)+Na), and this processing is ended. In this step S707, applications targeted for display are displayed within four lines or less.

FIGS. 8A and 8B depict views showing examples of a home screen displayed on the display unit 350 of the operation panel 102 when an anomaly has occurred in the image forming apparatus 100 according to the first embodiment. Note that in FIGS. 8A and 8B, portions that are in common with the above-described screens in FIGS. 4A and 4B are denoted by the same reference numerals. FIGS. 8A and 8B show an example of a screen to which the screen transitions from the home screen shown in FIG. 4A when the CPU 209 detects an anomaly in the image forming apparatus 100. Here, while the CPU 209 is detecting the anomaly of the image forming apparatus 100, the screens in FIGS. 8A and 8B are toggled and displayed on the display unit 350 of the operation panel 102 via the panel I/F unit 201 at a predetermined time interval.

In FIG. 8A, an error message 801 is an error message indicating the anomaly of the image forming apparatus 100 detected by the CPU 209. Here, it is displayed that "cassette 1" is out of paper, and the paper size and type are displayed. The application items 405 and 406 indicate application items that can be executed in the image forming apparatus 100 similarly to FIG. 4A. Again, the display of the scroll bar 404 for application items changes in accordance with the number of application items and the position of the cursor on the application items.

In FIG. 8B, the icon 401 and the text 402 are an icon and text displayed for indicating that this screen is the home screen.

In the state where a home screen such as in FIG. 4A that is described above is displayed, the user has an operational desire to select an executable application and instruct execution thereof. However, in the case where an anomaly occurs in the image forming apparatus 100 that is related to the execution, the user also has a desire for information regarding the anomaly.

In view of this, the screens in FIGS. 8A and 8B are screens for satisfying those desires of the user in the case where an anomaly occurs in the image forming apparatus 100. In FIG. 8A, the CPU 209 displays, using the error message 801, an error message corresponding to the anomaly that is occurring at that time, and further displays the application items 405 and 406 that are executable. However, from FIG. 8A alone, the user cannot see at which position in the screen hierarchy this screen is located, and thus the CPU 209 indicates to the user that the current screen is the home screen by toggling and displaying the screens in FIGS. 8A and 8B. That is, in FIG. 8B, the CPU 209 displays, as a content indicating the position of the current screen in the hierarchy, the icon 401 and the text 402 for indicating that the current screen is the home screen, as well as the application items 405 and 406 that are executable.

The display start position of the executable application items 405 and 406 in FIG. 8B is different from that in FIG. 4B in order to prevent the positions of the items 405 and 406 from varying while the screen in FIG. 8B and the home screen at the time of the occurrence of an anomaly in FIG. 8A are toggled and displayed. At the time of the occurrence of an anomaly, the CPU 209 toggles and displays the screens in FIGS. 8A and 8B, but if the screens in FIGS. 8A and 4B were toggled and displayed, the display positions of the application items 405 and 406 would move vertically, every time the user switches the screens. There is a risk that, when the user wants to execute desired processing, this makes it difficult for the user to perform the operation of selecting a desired application from the application items 405 and 406. Therefore, the display positions of the application items 405 and 406 in FIG. 8B are matched to those in the home screen in FIG. 8A that includes error message display, whereby the display positions of the application items 405 and 406 are fixed during the toggle display so as to not confuse the user.

FIGS. 9A to 9D depict views showing examples of an application screen displayed on the display unit 350 of the operation panel 102 when the user selects a print application in the image forming apparatus 100 according to the first embodiment and an anomaly occurs. In FIGS. 4A, 4B, 8A and 8B, the text in each line is provided with a frame, and thus only four lines of text can be displayed on the display unit 350, but in FIGS. 9A to 9D, the frame of each of the lines is omitted, and thus a maximum of five lines of text can be displayed.

Figure 9A:
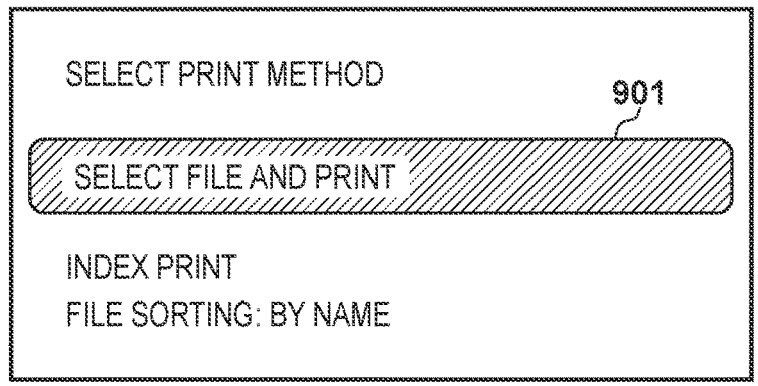
FIGS. 9A to 9D depict views showing examples of an application screen displayed on the display unit of the operation panel when a user selects a print application and an anomaly occurs in the image forming apparatus according to the first embodiment.
Figure 9B:
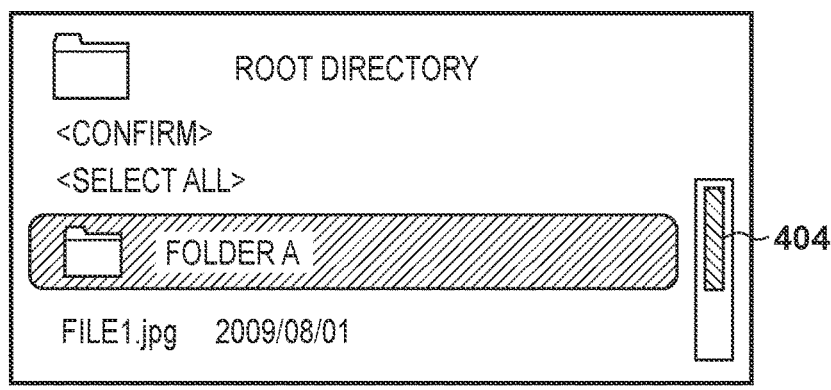
Figure 9C:
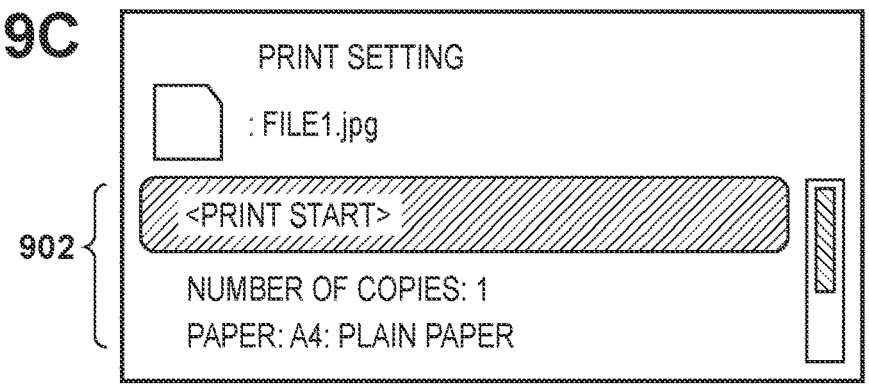
Figure 9D:
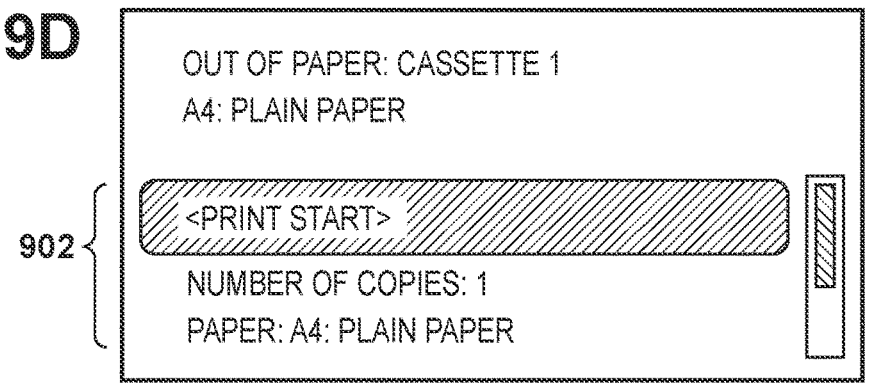

FIG. 9A shows an example of a setting screen to which the screen transitions in the case where the application "memory media" 406 is selected on the screen in FIG. 8A, or the application "memory media" 406 is selected in FIG. 8B. Also, FIG. 9B shows an example of a setting screen to which the screen transitions in the case where an application "select file and print" 901 is selected in FIG. 9A. Furthermore, FIG. 9C shows a screen example to which the screen transitions in the case where "FILE.jpg" of a folder A is selected in FIG. 9B, and FIG. 9D shows a screen example displayed when the designated cassette has run out of paper. Here, the screens in FIGS. 9C and 9D are toggled and displayed at a predetermined time interval.

In the state in which the screen shown in FIG. 9A is displayed, the user, in order to execute a target application, has a desire to efficiently designate specific execution contents and execute the application. In addition, when an error occurs, the user can recognize the content of the error in the home screen as shown in FIG. 8A, for example. Therefore, for example, in the case where the screen transitions to the screen of an application in FIG. 9C, an error message does not need to be constantly displayed. Therefore, on an application screen, the CPU 209 uses the entire screen as an application display area for instructing the execution of the application, without reducing the display area by displaying an error message as in FIG. 8A. Note that, there is a possibility that the error that is occurring influences the execution of the application, and thus as in FIGS. 9C and 9D, an error message is also displayed by toggling. At this time, in FIGS. 9C and 9D, similarly to the cases shown in FIGS. 8A and 8B that are described above, the position of an area 902 for displaying application execution contents such as "print start", the number of copies, the paper size and paper type is fixed, so as to prevent the user from having difficulty in performing operations during the toggle display.

As described above, according to the first embodiment, even with a screen with poor display capability, application information necessary for operations by the user as well as the specific content of an anomaly and the counter measure for the anomaly at the time of the occurrence thereof can be presented to the user, while minimizing the deterioration in operability for the user.

Second Embodiment

In the above first embodiment, in the case where the image forming apparatus 100 detects an anomaly, as in FIGS. 8A and 8B, the screen for displaying an error message and the home screen in which an error message is not displayed are toggled and displayed. On the other hand, in the second embodiment, instead of a plurality of screens being toggled and displayed, an error message is displayed in a home screen, and the error message is displayed as scrolling text. Note that the configuration and system configuration of the image forming apparatus 100 according to the second embodiment are similar to those in the above-described first embodiment, and thus description thereof is omitted.

Figure 10A:
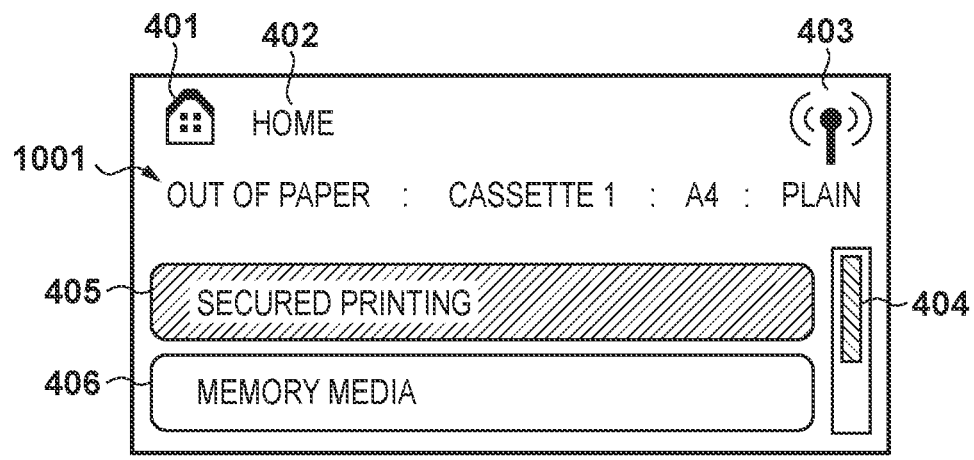
FIGS. 10A and 10B depict views showing examples of a home screen displayed on a display unit of an operation panel when an anomaly occurs in an image forming apparatus according to a second embodiment of the present invention.
Figure 10B:
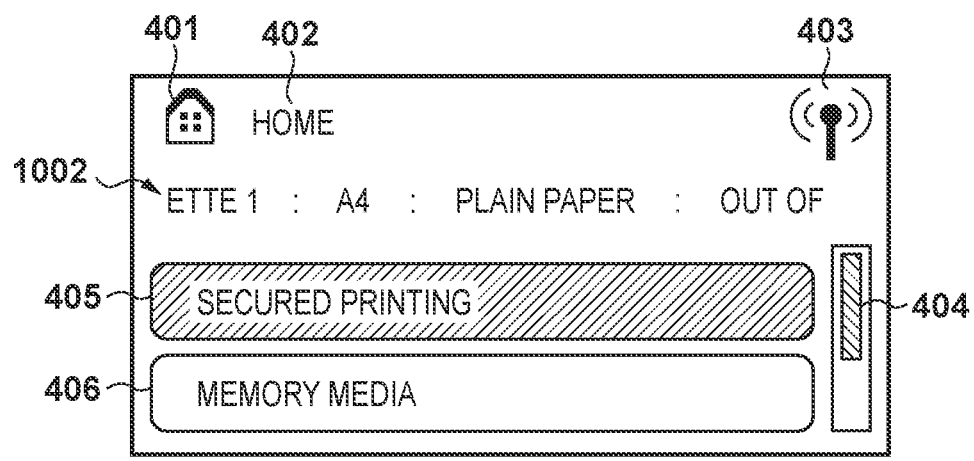

FIGS. 10A and 10B depict views showing examples of a home screen that is displayed on the display unit 350 of the operation panel 102 when an anomaly occurs in the image forming apparatus 100 according to the second embodiment of the present invention. Note that in FIGS. 10A and 10B, portions that are in common with the above-described screen in FIG. 4A are denoted by the same reference numerals.

In FIGS. 10A and 10B, reference numerals 1001 and 1002 indicate error messages that correspond to the contents of the anomaly of the image forming apparatus 100 detected by the CPU 209. Here, the CPU 209 displays text indicating a message while gradually moving the text from a display state denoted by 1001 in the left direction with the lapse of a predetermined time. While passing through a display state denoted by 1002, the movement of the text in a predetermined direction is repeated such that the text is displayed so as to appear to be flowing. Note that the movement direction of this text may be the right direction.

In addition, this method of displaying text while moving the text in the predetermined direction may be adopted in FIG. 9D in the above first embodiment.

As described above, according to the second embodiment, even with a screen with poor display capability, application information necessary for operations by the user as well as the specific content of an anomaly and the counter measure for the anomaly at the time of the occurrence thereof can be presented to the user, while minimizing the deterioration of operability for the user.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-139107, filed Jul. 10, 2015, which is hereby incorporated by reference herein in its entirety.

What is claimed is:

1. An information processing apparatus having a plurality of functions, comprising:
　a display; and
　at least one processor and at least one memory coupled to the at least one processor and having stored therein instructions that, when the at least one processor executes the instructions cause the information processing apparatus to:
　display an operation screen on the display, including a first display area and a second display area, wherein the first display area is scrollable and capable of displaying information regarding the plurality of functions or a part of the plurality of functions, and wherein the second display area displays, when an anomaly does not occur in the information processing apparatus, a name of the operation screen for displaying the information regarding at least a part of the plurality of functions;
　toggle information to be displayed on the second display area based on whether an anomaly occurs in the information processing apparatus;
　in a case where the anomaly occurs in the information processing apparatus, control to display, the second display area to be larger than the second display area is displayed in a state in which the anomaly does not occur, and display the first display area to be still scrollable and to be smaller than the first display area is displayed in a state in which the anomaly does not occur and fixing the display position of the first display area; and control to toggle the information to be displayed on the second display area, between the information that was displayed in the second display area in a case where the anomaly did not occur and information regarding the anomaly.

2. The information processing apparatus according to claim 1, wherein the at least one processor executes the instructions further to control, toggle and display a first screen for displaying the information regarding the anomaly in the second display area and a second screen for displaying a state of a screen in the second display area.

3. The information processing apparatus according to claim 1, wherein the at least one processor executes the instructions further to control, display text indicating the information regarding the anomaly in the second display area while moving the text in a predetermined direction.

4. The information processing apparatus according to claim 1, wherein the at least one processor executes the instructions further to control, when an application corresponding to information selected in the first display area is started, to transition to a setting screen of the application, and, if the anomaly occurs in the information processing apparatus, to display the information regarding the anomaly on a status confirmation screen of the application, and not display the information regarding the anomaly on the setting screen.

5. The information processing apparatus according to claim 4, wherein the at least one processor executes the instructions further to control, in the switch information, to toggle and display a status confirmation screen that includes the information regarding the anomaly and a status confirmation screen that does not include the information regarding the anomaly.

6. The information processing apparatus according to claim 4, wherein the at least one processor executes the instructions further to control to display, on the status confirmation screen that includes the information regarding the anomaly, text indicating the information regarding the anomaly while moving the text in a predetermined direction.

7. The information processing apparatus according to claim 1, wherein the information regarding the anomaly includes a type of the anomaly and information regarding a counter measure for the anomaly.

8. A method of controlling an information processing apparatus having a display and a plurality of functions, the method comprising:
displaying an operation screen on the display, including a first display area and a second display area, wherein the first display area is scrollable and capable of displaying information regarding the plurality of functions or a part of the plurality of functions, and wherein the second display area displays, when an anomaly does not occur in the information processing apparatus, a name of the operation screen for displaying the information regarding at least a part of the plurality of functions;
toggling information to be displayed on the second display area based on whether an anomaly occurs in the information processing apparatus;
in a case where the anomaly occurs in the information processing apparatus, controlling to display, on the display, the second display area to be larger than the second display area is displayed in a state in which the anomaly does not occur, and display the first display area to be still scrollable and to be smaller than the first display area is displayed in a state in which the anomaly does not occur and fixing the display position of the first display area; and control to toggle the information to be displayed on the second display area, between the information that was displayed in the second display area in a case where the anomaly did not occur and information regarding the anomaly.

9. A non-transitory computer-readable storage medium storing a program for causing a computer to a method of controlling an information processing apparatus having a display and a plurality of functions, the method comprising:
displaying an operation screen on the display, including a first display area and a second display area, wherein the first display area is scrollable and capable of displaying information regarding the plurality of functions or a part of the plurality of functions and wherein the second display area displays, when an anomaly does not occur in the information processing apparatus, a name of the operation screen for displaying the information regarding at least a part of the plurality of functions;
toggling information to be displayed on the second display area based on whether an anomaly occurs in the information processing apparatus;
in a case where the anomaly occurs in the information processing apparatus, controlling to display, on the display, the second display area to be larger than the second display area is displayed in a state in which the anomaly does not occur, and display the first display area to be still scrollable and to be smaller than the first display area is displayed in a state in which the anomaly does not occur and fixing the display position of the first display area; and control to toggle the information to be displayed on the second display area, between the information that was displayed in the second display area in a case where the anomaly did not occur and information regarding the anomaly.

10. The information processing apparatus according to claim 1, wherein a scroll bar for scrolling the first display area becomes shorter when the anomaly occurs and the scroll bar is displayed beside the first display area.

* * * * *